United States Patent
Sheu

(10) Patent No.: US 7,906,743 B2
(45) Date of Patent: Mar. 15, 2011

(54) GRADATION TWIN-WIRE EDM MANUFACTURING SYSTEM

(75) Inventor: Dong-Yea Sheu, Taipei (TW)

(73) Assignee: National Taipei University of Technology, Taipei (TW)

( * ) Notice: Subject to any disclaimer, the term of this patent is extended or adjusted under 35 U.S.C. 154(b) by 308 days.

(21) Appl. No.: 12/169,733

(22) Filed: Jul. 9, 2008

(65) Prior Publication Data

US 2010/0005650 A1    Jan. 14, 2010

(51) Int. Cl.
*B23H 7/30* (2006.01)

(52) U.S. Cl. .................. 219/69.2; 219/69.17

(58) Field of Classification Search .............. 29/729, 29/739, 740, 564.6; 219/69.2, 69.11; 204/202–206, 204/156; 314/68
See application file for complete search history.

(56) References Cited

U.S. PATENT DOCUMENTS

| | | | |
|---|---|---|---|
| 4,609,803 A * | 9/1986 | Inoue | 219/69.12 |
| 4,629,854 A * | 12/1986 | Inoue et al. | 219/69.14 |
| 5,051,554 A * | 9/1991 | Tsukamoto | 219/69.19 |
| 5,183,986 A * | 2/1993 | Magara et al. | 219/69.12 |
| 5,365,030 A * | 11/1994 | Hayakawa | 219/69.12 |
| 6,448,529 B1 * | 9/2002 | Hiraishi et al. | 219/69.16 |
| 7,019,247 B1 * | 3/2006 | MacGregor | 219/69.2 |

* cited by examiner

*Primary Examiner* — Minh Trinh
(74) *Attorney, Agent, or Firm* — Schmeiser, Olsen & Watts, LLP

(57) ABSTRACT

A gradation twin-wire EDM manufacturing system includes a manufacture machine, a wire feeding bobbin set mounted on the manufacture machine, a wire receiving bobbin set mounted on the manufacture machine, a gradation electro-insulated roller mounted on the manufacturing machine, two wires detoured around the wire feeding bobbin set, the gradation electro-insulated roller and the wire receiving bobbin set, a RC electro discharge circuit connected to one wire, and a transistor RC electro discharge circuit connected to another wire. Therefore, only one manufacture process is needed for a quick manufacture of a workpiece, and thus saving the manufacturing time and enhancing the efficiency.

7 Claims, 2 Drawing Sheets

GRADATION TWIN-WIRE EDM MANUFACTURING SYSTEM

FIELD OF THE INVENTION

The present invention relates to a graduation twin-wire Electrical Discharge Machining (hereinafter EDM) manufacturing system, and more particularly to a gradation twin-wire EDM manufacturing system that can save the manufacturing time and enhancing the manufacturing efficiency.

BACKGROUND OF THE INVENTION

In a general mechanical manufacture field such as a micro EDM field, a wire electro discharge grounding (WEDG) is used for manufacturing a micro electrode machining tool.

In the conventional electrical discharge manufacture field, two discharge circuits are generally used, and one of the discharge circuits is a resistance and capacitance (RC) electro discharge circuit. Since the discharge quantity of the RC electro discharge circuit is very small, the RC electro discharge circuit is applicable for a finish electro-discharge machining, but not applicable for a rough (large-area) electro-discharge machining, and thus the RC electro discharge circuit has a very poor efficiency on the manufacture of a large workpiece. The other discharge circuit is a transistor RC electro discharge circuit which can supply large instant current to provide a high discharge manufacturing capability and a high manufacture efficiency, and thus the transistor RC electro discharge circuit is applicable for a rough (large-area) electro-discharge machining, but not applicable for the finish electro-discharge machining.

More specifically, the power supply of the RC electro discharge circuit controls its discharge energy by a capacitor only, and thus a small discharge quantity of the manufacture can be provided, and users cannot adjust the On-Off time or control the electro discharge duration time. Furthermore, it takes a long time for shaping a rod electrode material with a larger diameter (such as over ψ0.5 mm) to meet the requirements of a micro electrode machining tool.

To reduce manufacturing time, manufacturers adopt the transistor RC electro discharge circuit to improve an instant increase of discharge energy and achieve the high efficiency of a discharge manufacture. However, for a finish electro-discharge machining, the transistor RC electro discharge circuit is restricted by the performance of transistors and the influence of stray capacitors, and an uneven surface frequency occurred in the process of manufacturing a micro electrode machining tool particularly the electrode machining tools below ψ0.1 mm.

In summation of the description above, technical problems exist regardless of using the RC electro discharge circuit or the transistor RC electro discharge circuit alone. In a process of manufacturing a micro electrode machining tool, the aforementioned rough electro-discharge machining (using a transistor RC electro discharge circuit) and finish electro-discharge machining (using a RC electro discharge circuit) are required, and thus resulting in a long manufacturing time and a low mass productivity. Obviously, the prior art requires further improvements.

SUMMARY OF THE INVENTION

In view of the foregoing shortcomings of the prior art, the inventor of the present invention based on years of experience in the related field to conduct extensive researches and experiments, and finally developed a gradation twin-wire EDM manufacturing system to overcome the shortcomings of the prior art.

The primary objective of the present invention is to provide a gradation twin-wire EDM manufacturing system, and more particularly to a gradation twin-wire EDM manufacturing system that can save the manufacturing time and enhancing the manufacturing efficiency.

To achieve the foregoing objective, the present invention provides a gradation twin-wire EDM manufacturing system, comprising a manufacture machine, a wire feeding bobbin set, a wire receiving bobbin set, a gradation electro-insulated roller, a twin-wire conductor wire module and a discharge circuit set.

The manufacture machine includes a working area, and the wire feeding bobbin set is pivotally coupled to the manufacture machine and includes an upper wire feeding bobbin and a lower wire feeding bobbin, and the wire receiving bobbin set is also pivotally coupled to the manufacture machine and includes an upper wire receiving bobbin and a lower wire receiving bobbin.

The gradation electro-insulated roller is pivotally coupled to the manufacture machine and corresponding to the working area, and the gradation electro-insulated roller includes an upper insulation guide groove and a lower insulation guide groove, and the upper insulation guide groove and the lower insulation guide groove constitute a gradation form, and the upper insulation guide groove is away from the working area, and the lower insulation guide groove is proximate to the working area.

The twin-wire conductor wire module includes an upper conductor wire and a lower conductor wire, and the upper conductor wire is wound at the upper wire feeding bobbin and slid through the upper insulation guide groove, and wound at the upper wire receiving bobbin again, and the lower conductor wire is wound at the lower wire feeding bobbin, and slid through the lower insulation guide groove, and wound at the lower wire receiving bobbin again.

The discharge circuit set includes a transistor RC electro discharge circuit and a RC electro discharge circuit, and the transistor RC electro discharge circuit is electrically connected to the upper conductor wire, and the RC electro discharge circuit is electrically connected to the lower conductor wire.

With the foregoing structure with a gradation design, the upper and lower insulation guide groove, the twin-wire upper and lower conductor wires, the transistor RC electro discharge circuit and the RC electro discharge circuit are adopted for performing both rough electro-discharge machining and finish electro-discharge machining simultaneously, so as to achieve a quick manufacture of a workpiece by only one manufacture process, and thus the invention saves the manufacturing time and enhances the efficiency.

DESCRIPTION OF THE PREFERRED EMBODIMENT

The above and other objects, features and advantages of the present invention will become apparent from the following detailed description taken with the accompanying drawing.

Figure 1:
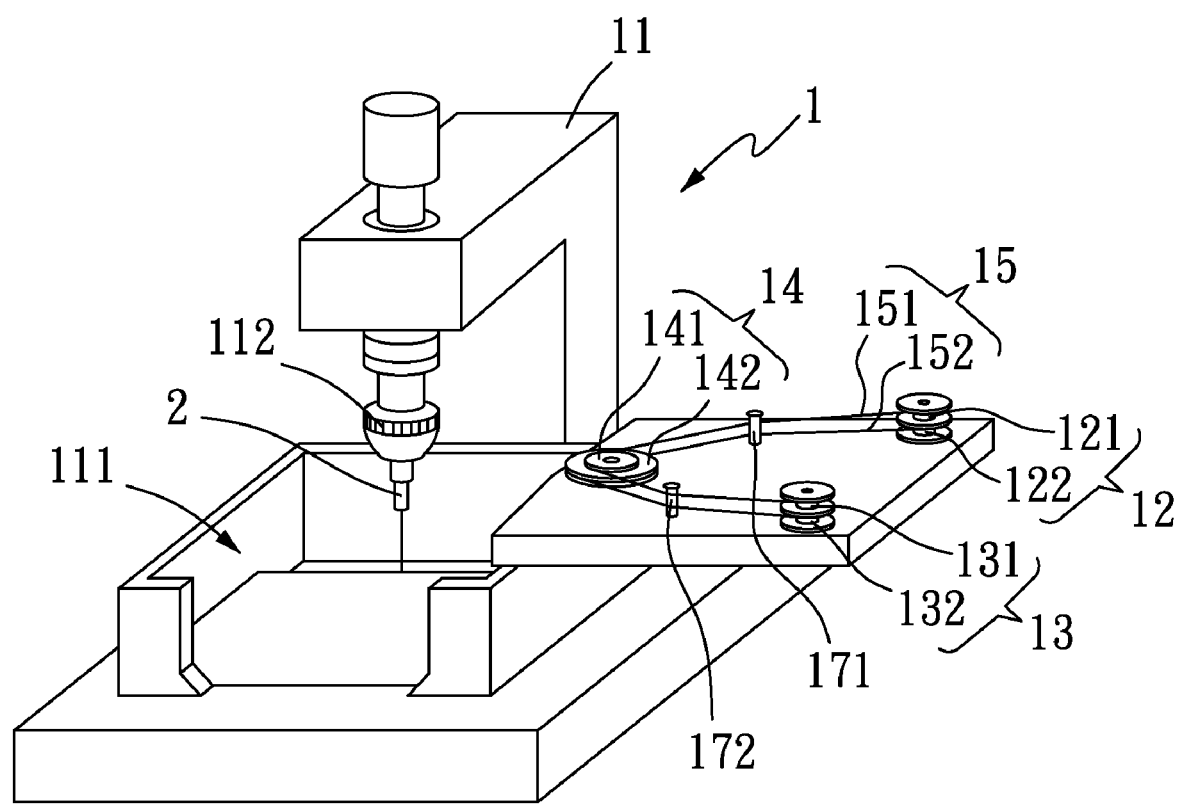
FIG. 1 is a perspective view of the present invention.
Figure 2:
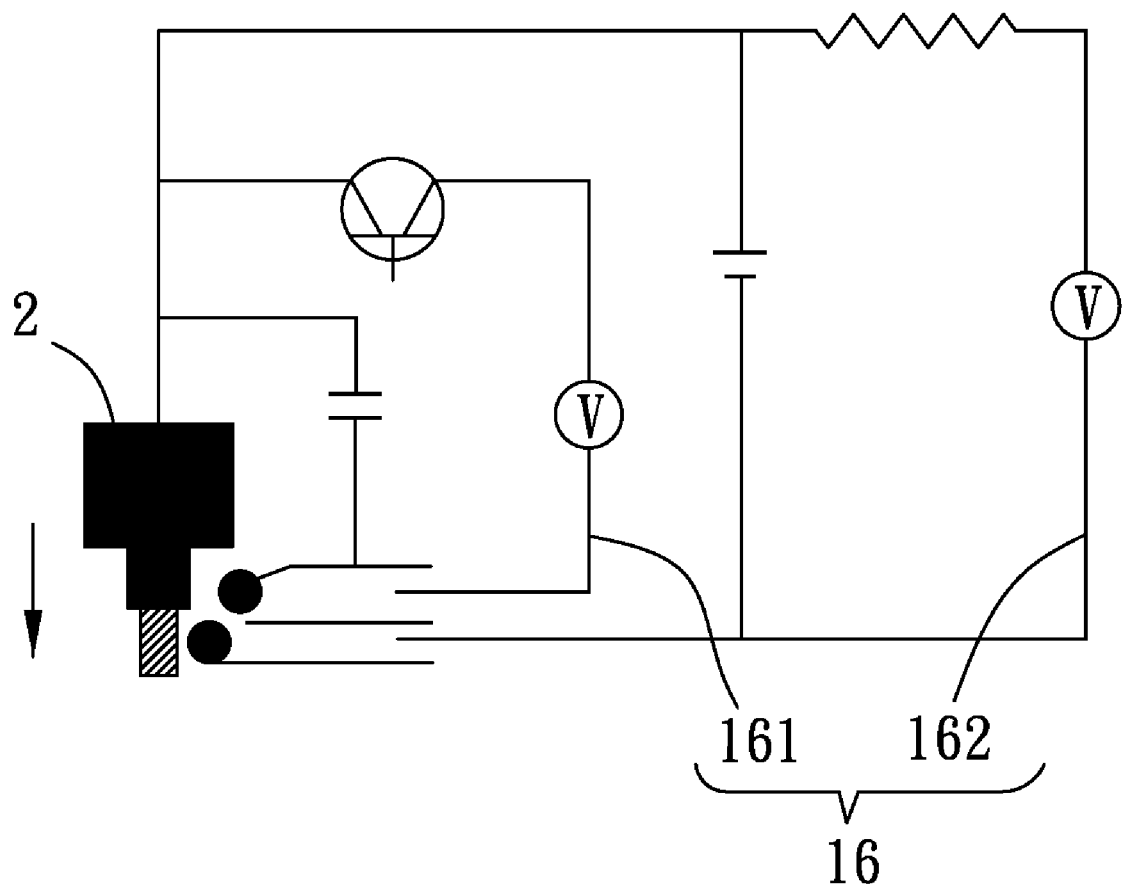
FIG. 2 is a schematic circuit diagram of two electro discharge circuits of the present invention.

With reference to FIGS. 1 and 2 for a perspective view of the invention and a schematic circuit diagram of a discharge circuit of the invention respectively, a gradation twin-wire EDM manufacturing system 1 comprises a manufacture machine 11, a wire feeding bobbin set 12, a wire receiving bobbin set 13, a gradation electro-insulated roller 14, a twin-wire conductor wire module 15 and a discharge circuit set 16.

The manufacture machine 11 includes a working area 111, and the wire feeding bobbin set 12 is pivotally coupled to the manufacture machine 11 and includes an upper wire feeding bobbin 121 and a lower wire feeding bobbin 122, and the wire receiving bobbin set 13 is also pivotally coupled to the manufacture machine 11 and includes an upper wire receiving bobbin 131 and a lower wire receiving bobbin 132.

In this preferred embodiment, the upper wire feeding bobbin 121 and the lower wire feeding bobbin 122 of the wire feeding bobbin set 12 are stacked with each other, and the upper wire receiving bobbin 131 and the lower wire receiving bobbin 132 of the wire receiving bobbin set 13 are also stacked with each other. Of course, the upper wire feeding bobbin 121 and the lower wire feeding bobbin 122 can be installed separately, and the upper wire receiving bobbin 131 and lower wire receiving bobbin 132 can also be installed separately.

The gradation electro-insulated roller 14 is pivotally coupled to the manufacture machine 11 and corresponding to a working area 111 of the manufacture machine 11, and the gradation electro-insulated roller 14 includes an upper insulation guide groove 141 and a lower insulation guide groove 142, and the upper insulation guide groove 141 and the lower insulation guide groove 142 constitute a gradation form, and the upper insulation guide groove 141 is away from the working area 111, and the lower insulation guide groove 142 is proximate to the working area 111.

The twin-wire conductor wire module 15 includes an upper conductor wire 151 and a lower conductor wire 152, and the upper conductor wire 151 is wound at the upper wire feeding bobbin 121 and slid through the upper insulation guide groove 141 and wound at the upper wire receiving bobbin 131 again, and the lower conductor wire 152 is wound at the lower wire feeding bobbin 122 and slid through the lower insulation guide groove 142 and wound at the lower wire receiving bobbin 132 again.

In this preferred embodiment, the upper conductor wire 151 and the lower conductor wire 152 are made of two completely separated copper wires, of course, other conductor wires such as tungsten wires, gold wires, silver wires, and etc. can be used.

The discharge circuit set 16 includes a transistor RC electro discharge circuit 161 and a RC electro discharge circuit 162, and the transistor RC electro discharge circuit 161 is electrically connected to the upper conductor wire 151, and the RC electro discharge circuit 162 is electrically connected to the lower conductor wire 152. Since the gradation electro-insulated roller 14 comes with an insulating design, the transistor RC electro discharge circuit 161 and the RC circuit 162 can be isolated completely and will not affect each other.

This preferred embodiment further comprise a front intermediate guide 171 and a rear intermediate guide 172, and the front intermediate guide 171 is pivotally coupled to the manufacture machine 11 and disposed between the wire feeding bobbin set 12 and the gradation electro-insulated roller 14, and the upper conductor wire 151 is slid through the front intermediate guide 171 first and then the upper insulation guide groove 141, and the lower conductor wire 152 is slid through the front intermediate guide 171 first and then the lower insulation guide groove 142.

Similarly, the rear intermediate guide 172 is pivotally coupled to the manufacture machine 11 and disposed between the gradation electro-insulated roller 14 and the wire receiving bobbin set 13, and the upper conductor wire 151 is slid through the rear intermediate guide 172 first, and then wound at the upper wire receiving bobbin 131, and the lower conductor wire 152 is slid through the rear intermediate guide 172 first and then wound at the lower wire receiving bobbin 132.

During a manufacture such as a micro EDM field for manufacturing a micro electrode machining tool, a rod electrode material 2 is placed at a clamping tool 112 of the manufacture machine 11, and the rod electrode material 2 is situated in the working area 111, and then an axial movement of the clamping tool 112 of the manufacture machine 11 drives the rod electrode material 2 to move downward with respect to the wire feeding bobbin set 12, the wire receiving bobbin set 13 and the gradation electro-insulated roller 14.

The clamping tool 112 of the manufacture machine 11 comes with a basic design of a general mechanical manufacture machine. For example, the clamping tool of a drilling machine is a gripping jaw of a drilling head and well known in the art, and thus will not be described here. The axial movements of the clamping tool 112 can be achieved by mechanical components such as a transmission axle, a gear, a gear rack, and a transmission belt, which are also well known in the art, and thus will not be described here.

In FIG. 2, when the rod electrode material 2 moves downward with respect to the wire feeding bobbin set 12, the wire receiving bobbin set 13 and the gradation electro-insulated roller 14, the upper conductor wire 151 wound at the upper wire feeding bobbin 121 and slid through the upper insulation guide groove 141 and wound at the upper wire receiving bobbin 131 again works to together with the transistor RC electro discharge circuit 161 to perform a rough electro-discharge machining to the rod electrode material 2.

Since the rod electrode material 2 keeps moving downward and the gradation gap between the upper insulation guide groove 141 and the lower insulation guide groove 142 is very small, therefore the lower conductor wire 152 wound at the lower wire feeding bobbin 122 and slid through the lower insulation guide groove 142 and wound at the lower wire receiving bobbin 132 again can perform a finish electro-discharge machining continuously to the part of the rod electrode material 2 which had been shaped by rough electro-discharge machining, to manufacture the required micro electrode machining tool. In general, a micro electrode machining tool of approximately □0.04 mm or even below □0.02 mm can be manufactured easily by the aforementioned manufacturing method.

From the description above, the gradation design of the upper insulation guide groove 141 and the lower insulation guide groove 142 and the twin-wire design of the upper conductor wire 151 and the lower conductor wire 152 work with the transistor RC electro discharge circuit 161 and the RC electro discharge circuit 162 simultaneously, both rough electro-discharge machining and finish electro-discharge machining can be achieved simultaneously. In other words, only one manufacture process is needed for a quick manufacture of a workpiece, such as the micro electrode machining tool manufactured from the rod electrode material as described in the aforementioned micro EDM field, and thus saving the manufacturing time and enhancing the efficiency.

The gradation twin-wire EDM manufacturing system 1 of the invention not only can be used in the micro EDM field to manufacture a micro electrode machining tool, but also can be applied in a quick manufacture of a conical probe used for testing a LCD panel or a quick manufacture of a micro punch head tool.

It is noteworthy to point out that although the rod electrode material 2 moves downward with respect to the wire feeding bobbin set 12, the wire receiving bobbin set 13 and the gradation electro-insulated roller 14 in this preferred embodiment, the manufacture machine 11 also can be designed to move the wire feeding bobbin set 12, the wire receiving bobbin set 13 and the gradation electro-insulated roller 14 upward with respect to the rod electrode material 2.

In the aforementioned structure, the transistor RC electro discharge circuit 161 is electrically connected to the upper conductor wire 151, and the RC electro discharge circuit 162 is electrically connected to the lower conductor wire 152. In other words, the upper conductor wire 151 operates with the transistor RC electro discharge circuit 161 to perform a rough electro-discharge machining, and the lower conductor wire 152 operates with the RC electro discharge circuit 162 to perform a finish electro-discharge machining. Since the finish electro-discharge machining purely use the RC electro discharge circuit 162, the circuit wiring can be simplified without the need of considering the stray capacitor of the circuit and the delay of the on-off time of the transistor. In other words, the transistor RC electro discharge circuit 161 performs a rough electro-discharge machining and there is no need to monitor the electric discharge condition, it is only necessary to detect the electric discharge condition of the RC electro discharge circuit 162 that performs a finish electro-discharge machining.

In summation of the description above, the gradation twin-wire EDM manufacturing system of the present invention improves over the prior art by using the gradation design, the upper and lower insulation guide groove, the twin-wire upper and lower conductor wires, and the transistor RC electro discharge circuit and the RC electro discharge circuit to save manufacturing time and enhance manufacturing efficiency. The invention complies with the patent application requirements, and thus is duly filed for patent application.

While the invention has been described by means of specific embodiments, numerous modifications and variations could be made thereto by those skilled in the art without departing from the scope and spirit of the invention set forth in the claims.

What is claimed is:

1. A gradation twin-wire electrical discharge machining (EDM) manufacturing system, comprising:
    a manufacture machine, including a working area;
    a wire feeding bobbin set, pivotally coupled to the manufacture machine, and including an upper wire feeding bobbin and a lower wire feeding bobbin;
    a wire receiving bobbin set, pivotally coupled to the manufacture machine, and including an upper wire receiving bobbin and a lower wire receiving bobbin;
    a gradation electro-insulated roller, pivotally coupled to the manufacture machine, and corresponding to the working area, and the gradation electro-insulated roller including an upper insulation guide groove and a lower insulation guide groove, and the upper insulation guide groove and the lower insulation guide groove constituting a gradation form, and the upper insulation guide groove being away from the working area, and the lower insulation guide groove being proximate to the working area;
    a twin-wire conductor wire module, including an upper conductor wire and a lower conductor wire, and the upper conductor wire being wound at the upper wire feeding bobbin first, and then slid through the upper insulation guide groove, and wound at the upper wire receiving bobbin again, and the lower conductor wire being wound at the lower wire feeding bobbin first, and then slid through the lower insulation guide groove, and wound at the lower wire receiving bobbin again; and
    a discharge circuit set, including a transistor resistance and capacitance (RC) electro discharge circuit and a resistance and capacitance (RC) electro discharge circuit, and the transistor resistance and capacitance (RC) electro discharge circuit being electrically coupled to the upper conductor wire, and the resistance and capacitance (RC) electro discharge circuit being electrically coupled to the lower conductor wire.

2. The gradation twin-wire electrical discharge machining (EDM) manufacturing system of claim 1, wherein the upper wire feeding bobbin and the lower wire feeding bobbin are stacked with each other.

3. The gradation twin-wire electrical discharge machining (EDM) manufacturing system of claim 1, wherein the upper wire receiving bobbin and the lower wire receiving bobbin are stacked with each other.

4. The gradation twin-wire electrical discharge machining (EDM) manufacturing system of claim 1, wherein the upper conductor wire is a copper wire.

5. The gradation twin-wire electrical discharge machining (EDM) manufacturing system of claim 1, wherein the lower conductor wire is a copper wire.

6. The gradation twin-wire electrical discharge machining (EDM) manufacturing system of claim 1, further comprising a front intermediate guide, pivotally coupled to the manufacture machine, and disposed between the wire feeding bobbin set and the gradation electro-insulated roller, and the upper conductor wire being slid through the front intermediate guide first and then the upper insulation guide groove, and the lower conductor wire being slid through the front intermediate guide first and then the lower insulation guide groove.

7. The gradation twin-wire electrical discharge machining (EDM) manufacturing system of claim 1, further comprising a rear intermediate guide, pivotally coupled to the manufacture machine, and disposed between the gradation electro-insulated roller and the wire receiving bobbin set, and the upper conductor wire being slid through the rear intermediate guide and wound at the upper wire receiving bobbin, and the lower conductor wire being slid through the rear intermediate guide and wound at the lower wire receiving bobbin.

* * * * *